(12) United States Patent  
Li et al.

(10) Patent No.: US 10,647,409 B2  
(45) Date of Patent: May 12, 2020

(54) PROPELLER AND AERIAL VEHICLE, CONTAINING LOCKING DEVICE

(71) Applicant: SZ DJI TECHNOLOGY CO., LTD., Shenzhen (CN)

(72) Inventors: Weidong Li, Shenzhen (CN); Xifeng Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 150 days.

(21) Appl. No.: 15/584,643

(22) Filed: May 2, 2017

(65) Prior Publication Data

US 2017/0233062 A1   Aug. 17, 2017

Related U.S. Application Data

(63) Continuation of application No. PCT/CN2014/090275, filed on Nov. 4, 2014.

(51) Int. Cl.
*B64C 11/02* (2006.01)
*B64C 11/00* (2006.01)
(Continued)

(52) U.S. Cl.
CPC .............. *B64C 11/02* (2013.01); *A63H 27/02* (2013.01); *B64C 11/00* (2013.01); *B64C 39/024* (2013.01);
(Continued)

(58) Field of Classification Search
CPC ....... B64C 11/02; B64C 11/00; B64C 39/024; B64C 2201/165; A63H 27/02; F02B 75/34
(Continued)

(56) References Cited

U.S. PATENT DOCUMENTS 2,353,431 A   7/1944 Arden
4,109,549 A * 8/1978 Vincent .................. F02B 75/34
                                                  244/60
(Continued)

FOREIGN PATENT DOCUMENTS

CN            2897580 Y     5/2007
CN         201367780 Y    12/2009
(Continued)

OTHER PUBLICATIONS

The World Intellectual Property Organization (WIPO) International Search Report for PCT/CN2014/090275 dated May 6, 2015 8 Pages.

*Primary Examiner* — Mahmoud Gimie
(74) *Attorney, Agent, or Firm* — Anova Law Group, PLLC

(57) ABSTRACT

Locking device, propeller, and aerial vehicle are provided. An exemplary propeller includes a blade; and a locking part, configured for locking the blade to a driving shaft. The locking part includes a fastening portion and a pressing portion. The pressing portion includes a pressing end, an abutting end including an accommodating hole, and an abutting part configured within the accommodating hole for abutting against the fastening portion. The fastening portion is accommodable within the accommodating hole of the pressing portion. The pressing portion of the locking part is slidably connected with the blade. A portion of the driving shaft protrudes into the accommodating hole of the pressing portion. The fastening portion is abutted against the abutting part of the pressing portion and engaged with the driving shaft to lock the driving shaft on the blade.

20 Claims, 6 Drawing Sheets

(51) Int. Cl.
    *B64C 39/02*    (2006.01)
    *A63H 27/00*    (2006.01)
    *F02B 75/34*    (2006.01)
(52) U.S. Cl.
    CPC ........ *F02B 75/34* (2013.01); *B64C 2201/165* (2013.01)
(58) Field of Classification Search
    USPC .......................................................... 416/135
    See application file for complete search history.

(56) References Cited

U.S. PATENT DOCUMENTS

| | | | | |
|---|---|---|---|---|
| 4,440,122 | A * | 4/1984 | Theobald | .................. F02B 9/06 123/185.14 |
| 8,430,709 | B1 * | 4/2013 | Wong | ..................... A63H 27/02 446/34 |

FOREIGN PATENT DOCUMENTS

| | | |
|---|---|---|
| CN | 201575888 U | 9/2010 |
| CN | 101859970 A | 10/2010 |
| CN | 202185744 U | 4/2012 |
| CN | 103065824 A | 4/2013 |
| CN | 104037540 A | 9/2014 |
| CN | 204210728 U | 3/2015 |
| GB | 202200 A | 8/1923 |
| JP | H01105018 A | 4/1989 |
| JP | H06281525 A | 10/1994 |
| JP | H07312904 A | 12/1995 |
| JP | 2000230567 A | 8/2000 |
| JP | 2000234629 A | 8/2000 |

* cited by examiner

PROPELLER AND AERIAL VEHICLE, CONTAINING LOCKING DEVICE

CROSS-REFERENCE TO RELATED APPLICATION

This is a continuation application of International Application No. PCT/CN2014/090275, filed on Nov. 4, 2014, the entire content of which is incorporated herein by reference.

TECHNICAL FIELD

The present disclosure generally relates to propeller technologies, and in particular, relates to a locking device, and a propeller, and an aerial vehicle.

BACKGROUND OF THE DISCLOSURE

Propellers are typically used as power thruster for aerial vehicles or ships. A propeller may include a base body and blades mounted onto the base body. A driving shaft can be connected with the base body. The driving shaft can be driven to rotate by an electric motor, and can thus bring the blade to rotate together. The driving shaft can be connected with the base body through a threaded fitting. Alternatively, screw holes can be provided on the base body and the driving shaft, and then the base body can be fixedly mounted on the driving shaft with screws.

In case the base body is connected with the rotating shaft through a threaded fitting, a tightening direction of the base body is the same as a rotating direction of the blades during an operation of the propeller, such that the blades can be firmly connected with the rotating shaft during a startup and an operation of the propeller. However, if the blades experience a sudden deceleration or a large change in acceleration, the threaded fitting between the base body and the driving shaft may be easily loosen or released. In addition, in case of vibrations having large amplitude, the fitting between the base body and the driving shaft may be loosened, resulting in the blade emitting out from the propeller. On the other hand, the screw connection between the base body and the driving shaft may not be readily detachable.

SUMMARY OF THE DISCLOSURE

The present disclosure provides a locking device, a detachable propeller containing the locking device, and an aerial vehicle containing the propeller.

One aspect of present disclosure provides a propeller. The propeller includes a blade; and a locking part, configured for locking the blade to a driving shaft. The locking part includes a fastening portion, and a pressing portion. The pressing portion includes a pressing end, an abutting end including an accommodating hole, and an abutting part configured within the accommodating hole for abutting against the fastening portion. The fastening portion is accommodable within the accommodating hole of the pressing portion. The pressing portion of the locking part is slidably connected with the blade. A portion of the driving shaft protrudes into the accommodating hole of the pressing portion. The fastening portion is abutted against the abutting part of the pressing portion and engaged with the driving shaft to lock the driving shaft on the blade.

Optionally, the fastening portion has a shape fitting with a snap slot configured on an end of a fastening arm on the driving shaft. The accommodating hole receives a portion of the fastening arm protruding into the accommodating hole. The abutting part abuts against the fastening portion to snap fit the fastening portion into the snap slot, to lock the driving shaft to the blade.

Optionally, the abutting part is released from the fastening portion when the pressing portion slides to a preset position relative to the blade, such that the fastening portion is released from the driving shaft to unlock the driving shaft from the blade.

Optionally, the abutting part is in a wedge shape.

Optionally, a diameter of the accommodating hole increases in a direction from an opening in a surface of the abutting end into the pressing portion, and an inner side surface of the accommodating hole forms the wedge shape.

Optionally, the fastening portion includes one or more balls made from a metal material. Optionally, the fastening portion includes 1 to 4 balls.

Optionally, the propeller further includes a mounting base connected with the blade. The mounting base includes a mounting hole for connecting with the driving shaft and a through hole penetrating through the mounting base from a bottom surface of the mounting hole. A fastening arm of the driving shaft passes through the through hole and protrudes into the accommodating hole.

Optionally, the driving shaft is threadedly connected with the mounting hole.

Optionally, a second through hole is provided on the blade, the mounting base is fixed in the second through hole, and the pressing portion is slidably configured in the second through hole.

Optionally, the locking part further includes: an elastic member, abutting between the pressing portion and the mounting base, a first blocking part, provided on an inner side wall of the second through hole, and a second blocking part, corresponding to the first blocking part and provided on the pressing portion. The first blocking part and the second blocking part match with each other to confine a movement of the pressing portion within the second through hole.

Optionally, when the fastening portion is fastened with the driving shaft, a distance between a top on the fastening portion distal from the driving shaft and a bottom surface of the accommodating hole is less than a diameter of the fastening portion, such that the fastening portion is position-limited at a periphery area around the fastening arm.

Another aspect of present disclosure provides an aerial vehicle. The aerial vehicle includes an aerial vehicle body, including an electric motor and a propeller connected with a driving shaft of the electric motor. The propeller includes a blade; and a locking part configured for locking the blade to the driving shaft. The locking part includes: a fastening portion, and a pressing portion. The pressing portion includes a pressing end, an abutting end including an accommodating hole, and an abutting part configured within the accommodating hole for abutting against the fastening portion. The fastening portion is accommodable within the accommodating hole of the pressing portion. The pressing portion of the locking part is slidably connected with the blade, a portion of the driving shaft protrudes into the accommodating hole of the pressing portion, and the fastening portion is abutted against the abutting part of the pressing portion and engaged with the driving shaft to lock the driving shaft on the blade.

Optionally, the fastening portion has a shape fitting with a snap slot configured on an end of a fastening arm on the driving shaft. The accommodating hole receives a portion of the fastening arm protruding into the accommodating hole.

The abutting part abuts against the fastening portion to snap fit the fastening portion into the snap slot, to lock the driving shaft to the blade.

Optionally, the abutting part is released from the fastening portion when the pressing portion slides to a preset position relative to the blade, such that the fastening portion is released from the driving shaft to unlock the driving shaft from the blade.

Optionally, the abutting part is in a wedge shape. Optionally, a diameter of the accommodating hole increases in a direction from an opening in a surface of the abutting end into the pressing portion, and an inner side surface of the accommodating hole forms the wedge shape.

Optionally, the fastening portion includes one or more balls made from a metal material. Optionally, the fastening portion includes 1 to 4 balls.

Optionally, the snap slot is a recess formed by recessing inwardly from an outer side surface of the end of the fastening arm.

Other aspects or embodiments of the present disclosure can be understood by those skilled in the art in light of the description, the claims, and the drawings of the present disclosure

BRIEF DESCRIPTION OF THE DRAWINGS

The following drawings are merely examples for illustrative purposes according to various disclosed embodiments and are not intended to limit the scope of the present disclosure.

Figure 1:
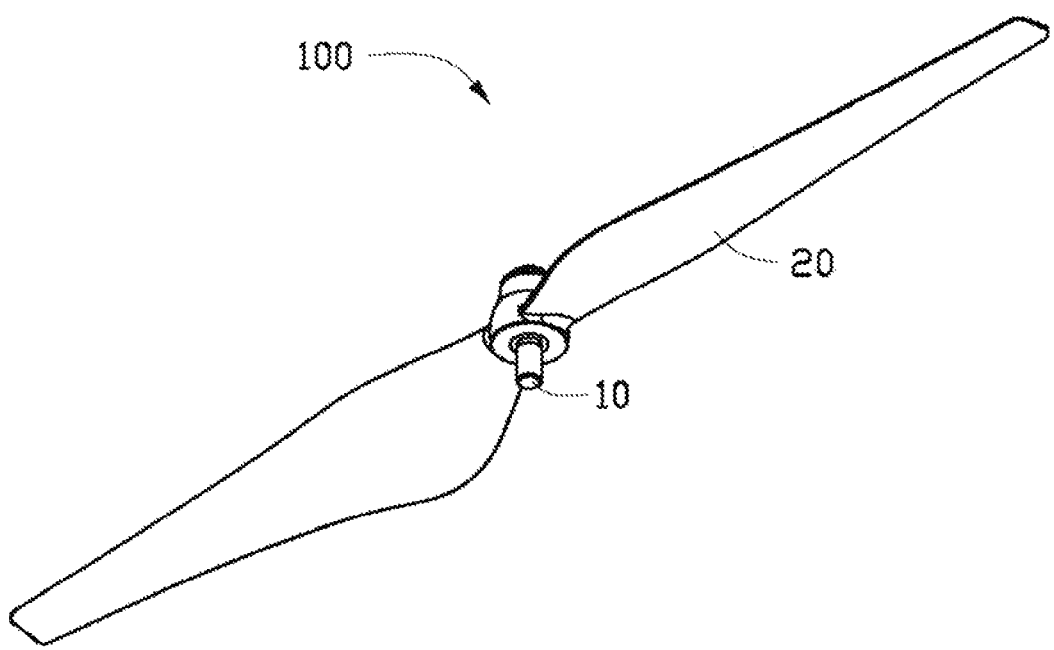
FIG. 1 is a schematic view showing a propeller, according to an embodiment of the present disclosure.

The present disclosure will be described in the following embodiments with reference to the above described drawings.

DETAILED DESCRIPTION OF THE DISCLOSURE

Reference will now be made in detail to exemplary embodiments of the disclosure, which are illustrated in the accompanying, drawings. Wherever possible, the same reference numbers will be used throughout the drawings to refer to the same or like parts.

Various embodiments of present disclosure provide a locking device, a propeller, and an aerial vehicle. The propeller may contain a locking device. The aerial vehicle may contain a propeller.

For example, a locking device may be configured for locking a first body to a second body. The locking device may include a kicking part. The locking part may include a fastening portion and a pressing portion.

The pressing portion may include a pressing end and an abutting end, disposed on opposite ends of the pressing portion. An accommodating hole may be provided at the abutting end and into the pressing portion. An abutting part for abutting against the fastening portion may be provided within the accommodating hole, for example, on an inner wall surface of the accommodating hole. The fastening portion may be received within the accommodating hole, and the pressing portion may be slidably connected with the first body.

In one embodiment, the first body may be a blade.

The accommodating hole may receive a portion of the second body. In one embodiment, the second body may include a driving shaft including, for example, a fastening arm, which may protrude into the accommodating hole. The abutting part may abut against the fastening portion to snap fit with a snap slot of the fastening arm, such that the second body is locked on the first body.

In some embodiments, the fastening portion may have a shape and/or a dimension fitting with the snap slot which may be provided at a free end of the fastening arm on the second body. The accommodating hole may receive a portion of the fastening arm protruding into the accommodating hole, the abutting part may abut against the fastening portion to snap fit onto the snap slot. As such, the second body is locked to the first body.

In some embodiments, the abutting part may be released from the fastening portion when the pressing portion slides to a preset position relative to the first body. The fastening portion may be released from the second body to unlock the second body from the first body. In some embodiments, the abutting part may be in a wedge shape.

In some embodiments, a diameter of the accommodating hole may increase a depth thereof increases, and an inner side surface of the accommodating hole may form the wedge shape.

In some embodiments, wherein the fastening portion is a ball made from a metal material.

In some embodiments, the locking device may further include a mounting base which is connected with the first body. The mounting base may include a mounting hole to be connected with the second body and a first through hole penetrating through the mounting base from a bottom surface of the mounting hole. The fastening arm of the second body may pass through the first through hole and protrude into the accommodating hole of the pressing portion.

In some embodiments, the second body may be threadedly connected with the mounting hole.

In other embodiments, the locking part may include an elastic member abutting between the pressing portion and the first body. A first blocking part may be provided on the first body. A second blocking part corresponding to first blocking part may be provided on the pressing portion. The first blocking part and the second blocking part may match with each other to control a movement of the pressing portion relative to the first body.

In some embodiments, when the fastening portion is fastened to the second body, a distance between a top of the fastening portion distal from the second body and a bottom surface of a second accommodating hole may be less than a diameter of the fastening portion, such that the fastening portion is position-limited at a periphery area of the fastening arm.

In various embodiments, the propeller may contain the disclosed locking device. The aerial vehicle may contain the disclosed propeller.

FIG. 1 is a schematic view showing a propeller 100, according to an embodiment of the present disclosure. The propeller 100 can include a blade 20 which is connected with a driving shaft 10. The driving shaft 10 can be connected with an electric motor (not shown). The electric motor may drive the driving shaft 10 to rotate, thereby driving a rotation of the blade 20. The propeller 100 can be used in aerial vehicles such as an unmanned aerial vehicle, a remotely controlled aircraft and the like.

Figure 2:
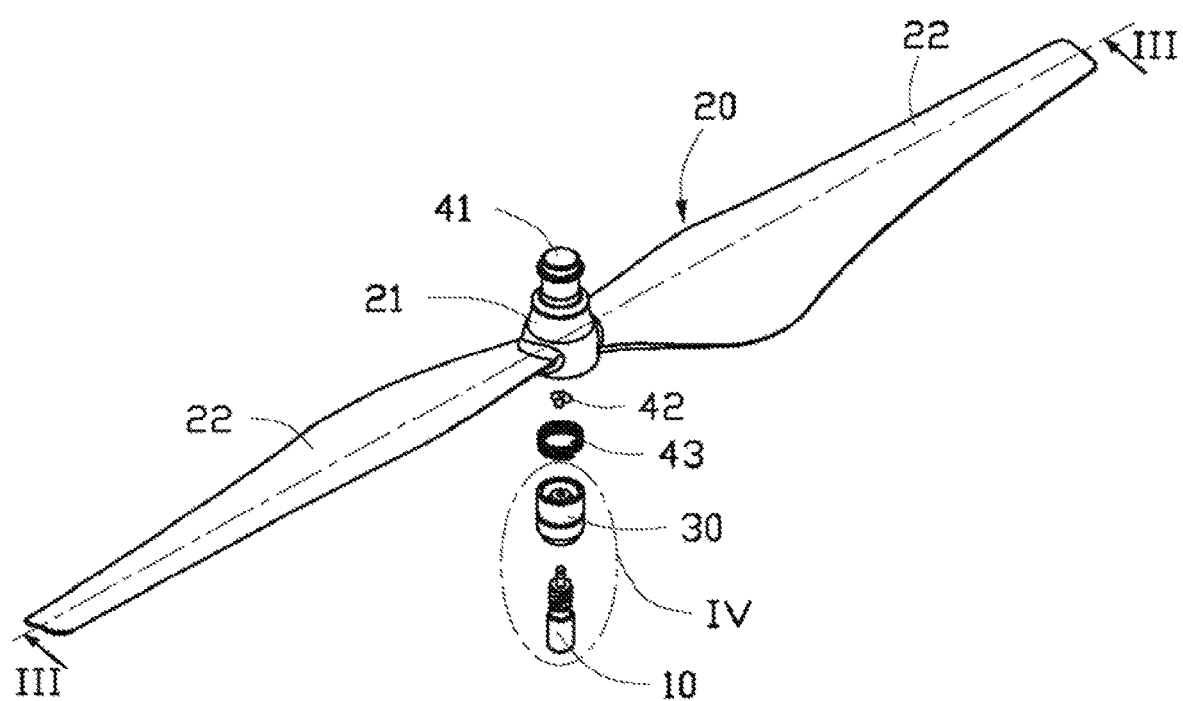
FIG. 2 is an exploded view of the propeller of FIG. 1, according to an embodiment of the present disclosure.
Figure 3:
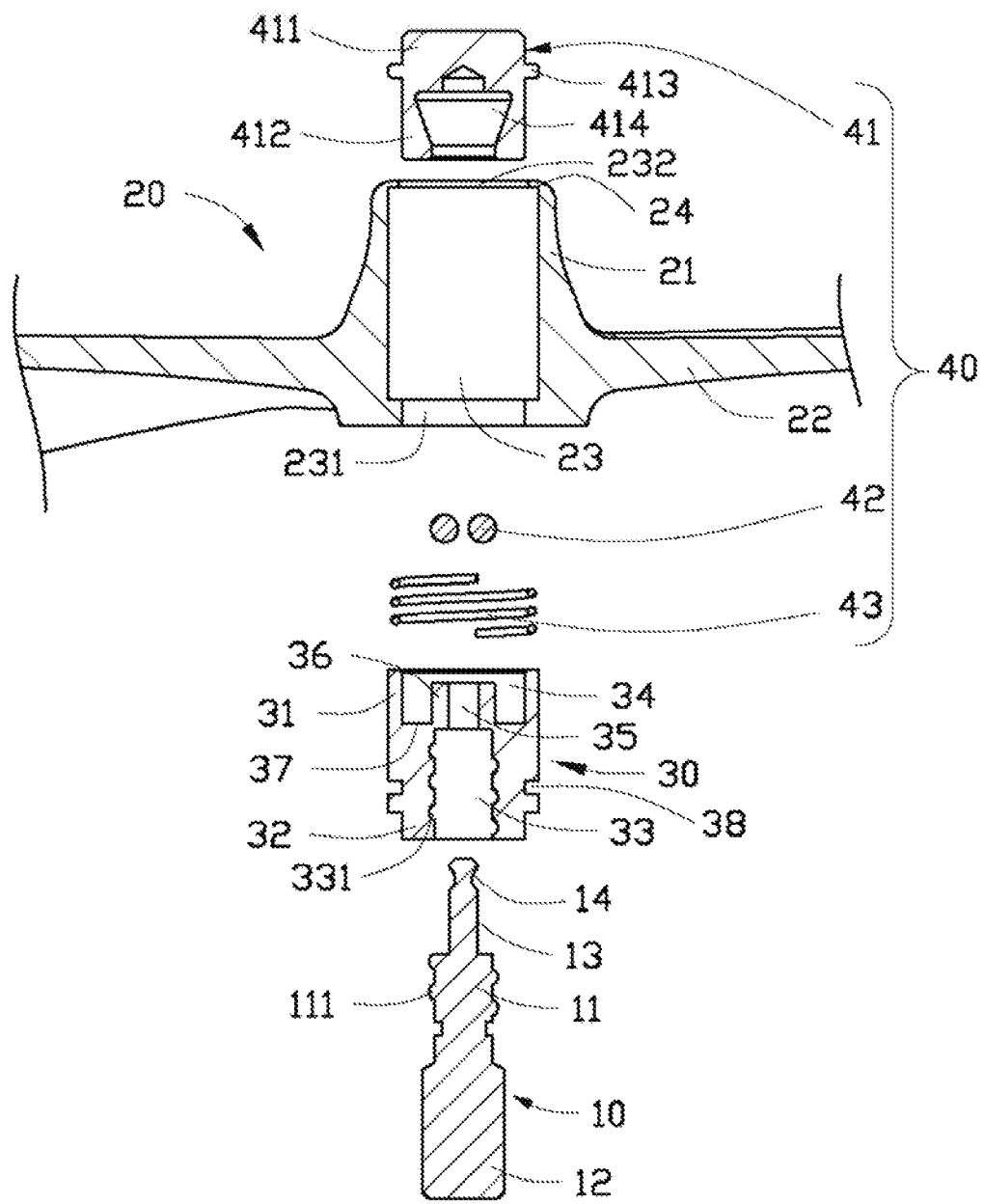
FIG. 3 is a cross sectional view of the propeller of FIG. 2 along III-III direction, according to an embodiment of the present disclosure.

Referring to FIG. 2 and FIG. 3, the propeller 100 can further include a mounting base 30 and a locking device including a locking part 40. The locking part 40 can include a pressing portion 41 and a fastening portion 42. In some embodiments, the locking part 40 includes an elastic member 43.

The blade 20 can include a blade base 21 and a vane 22. A first through hole 23 is provided on the blade base 21. The first through hole 23 can include a first opening 231 and a second opening 232 which are disposed at opposite ends of the first through hole 23, as shown in FIG. 3. A first blocking part 24 can be provided on an inner side wall of the first through hole 23 at a position proximal to the second opening 232. In some embodiments, the first blocking part 24 is an annular blocking ring protruding from the inner side wall of the first through hole 23.

In some embodiments, the blade base 21 and the vane 22 of the blade 20 are provided integrally by an injection molding. A recess 38 can be formed by recessing inwardly on an outer side wall of the mounting base 30. During injection molding the blade 20, the mounting base 30 can first be positioned within a cavity of the mold, and then melted plastic can be injected into the cavity. The recess 38 can be filled by the melted plastic during the injection molding, such that the mounting base 30 is directly fixed within the blade base 21 of the blade 20 after demolding. The recess 38 can increase a bonding between the mounting base 30 and the blade base 21. In some instances, the recess 38 can be an annular slot or a plurality of holes formed by recessing inwardly from the outer side wall of the mounting base 30. Alternatively, a protrusion is provided on the outer side wall of the mounting base 30. During the injection molding, the protrusion can be enclosed by the melted plastic, thereby increasing the bonding between the mounting base 30 and the blade base 21.

Alternatively, the mounting base 30 is inserted into the first through hole 23 via the first opening 231, and firmly connected with the blade base 21. The mounting base 30 can be connected with or otherwise engaged with the blade base 21 by adhesion, interference fit, snap fit or the like. Since the mounting base 30 is firmly connected with the blade base 21, the mounting base 30 can drive a rotation of a vane 22 of the blade 20 when an electric motor drives the driving shaft 10 to rotate.

In some embodiments, a diameter of the first opening 231 of the first through hole 23 is smaller than a maximum diameter of the mounting base 30, such that the mounting base 30 is not releasable from the first opening 231 of the first through hole 23. A diameter of the second opening 232 of the first through hole 23 is greater than the maximum diameter of the mounting base 30, such that the mounting base 30 can be inserted into the first through hole 23 via the second opening 232. Alternatively, the blade base 21 may be manufactured from elastic materials. The second opening 232 of the first through hole 23 can be equal to or slightly smaller than the maximum diameter of the mounting base 30, such that the mounting base 30 can be mounted into the first through hole 23 via the second opening 232 by virtue of an elastic deformation of the elastic materials.

Figure 4:
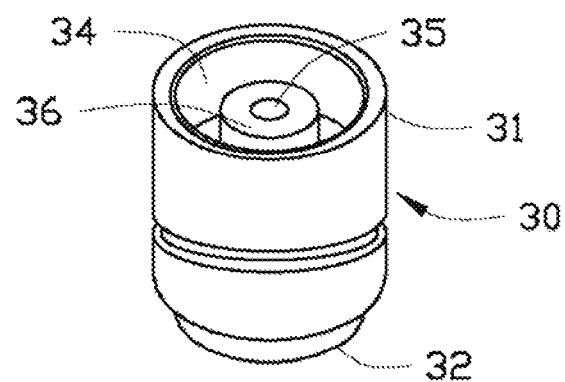
FIG. 4 is a schematic view of a driving shaft and a mounting base of FIG. 1, according to an embodiment of the present disclosure.
Figure 4:
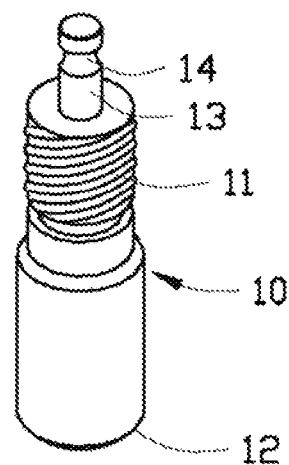

Referring to FIG. 3 and FIG. 4, the driving shaft 10 includes a first end portion 11 and a second end portion 12 which are disposed at opposite ends of the driving shaft 10. The driving shaft 10 can be connected with the mounting base 30 at the first end portion 11, and connected with the electric motor (not shown) at the second end portion 12. The driving shaft 10 can further include a fastening arm 13 which protruding from the first end portion 11 and extending axially along the driving shaft 10. A snap slot 14 matching the fastening portion 42 can be provided at a free end of the fastening arm 13, e.g., an end opposite to the second end portion 12. In some embodiments, the snap slot 14 includes an annular recess formed by recessing inwardly from an outer side wall of the fastening arm 13, at a position on the fastening arm 13 proximal to the free end. Alternatively, the snap slot 14 includes one or more recesses formed by recessing inwardly from an outer side wall of the fastening arm 13, at a position or positions on the fastening arm 13 proximal to the free end.

The mounting base 30 can include a third end portion 31 and a fourth end portion 32 which are disposed at opposite ends of the mounting base 30. A mounting hole 33 can be provided at the fourth end portion 32 of the mounting base 30. In some embodiments, the driving shaft 10 is connected with the mounting base 30 by a threaded fitting. For instance, an external thread 111 is provided on the first end portion 11 of the driving shaft 10, and an internal thread 331 is provided within a mounting hole 33 at the fourth end portion 32 of the mounting base 30, as shown in FIG. 3.

A second through hole 35 penetrating through the mounting hole 33 and the third end portion 31 can be provided on a bottom surface of the mounting hole 33 of the mounting base 30. When the first end portion 11 of the driving shaft 10 is connected with the mounting hole 33 of the mounting base 30, the fastening arm 13 can pass through the mounting hole 33 and the second through hole 35 and protrude out from the second through hole 35.

In some embodiments, a first accommodating hole 34 is provided at the third end portion 31 of the mounting base 30. The second through hole 35 can penetrate through a bottom of the first accommodating hole 34 and the mounting hole 33. When the first end portion 11 of the driving shaft 10 is connected with the mounting base 30, the fastening arm 13 can pass through the mounting hole 33 and the second through hole 35 and protrude out from the second through hole 35.

In some embodiments, a protrusion 36 is provided on a bottom surface 37 of the first accommodating hole 34. The second through hole 35 can be provided through the protrusion 36 and open at a top surface of the protrusion 36.

The pressing portion 41 of the locking part 40 can include a second accommodating hole 414 and an abutting part 415 disposed in the second accommodating hole 414. In some embodiments, a cross section of the abutting part 415 is provided in a wedge shape. The abutting part 415 can be tapered along a direction towards the first opening 231; in other words, a width of the aperture of the abutting part 415 is reducing along a direction towards the first opening 231. Alternatively, the abutting part 415 is an elastic member disposed on an inner side wall of the second accommodating hole 414. The elastic member can be compressed elastically along a radial direction of the second accommodating hole 414.

In some embodiments, the pressing portion 41 includes a pressing end 411 and an abutting end 412, which are disposed at opposite ends of the pressing portion 41. A second blocking part 413 can be provided on the outer side wall of the pressing portion 41 at a position proximal to the pressing end 411. The second accommodating hole 414 can be provided at the abutting end 412 of the pressing portion 41. A cross section of the abutting part 415 can be provided in a wedge shape. A diameter of the second accommodating hole 414 can gradually increase in a direction from the abutting end 412 to the pressing end 411 with a depth of the second accommodating hole 414 increasing. The wedge shape can be formed by an inner side wall of the second accommodating hole 414. Alternatively, the abutting part 415 is a wedge-shaped block which is fixed on the inner side wall of the second accommodating hole 414.

In some embodiments, the second blocking part 413 is an annular blocking ring protruding from an outer side wall of the pressing portion 41.

The abutting end 412 of the pressing portion 41 can be inserted into the first through hole 23 through the second opening 232 of the first through hole 23 of the blade 20. An outer diameter of the second blocking part 413 of the pressing portion 41 can be greater than an inner diameter of the first through hole 23 of the blade 20 at the first blocking part 24. The pressing portion 41 can be manufactured from elastic materials, such as rubber, plastic cement, and the like. When the abutting end 412 of the pressing portion 41 is inserted into the first through hole 23 through the second opening 232 of the first through hole 23 of the blade 20, the first blocking part 24 of the first through hole 23 may prevent the second blocking part 413 of the pressing portion 41 from entering into the first through hole 23. At this time, a large pressure may be applied onto the pressing portion 41. In some embodiments, the blade 20 and the pressing portion 41 are each manufactured from elastic materials, and the second blocking part 413 of the pressing portion 41 can be forced into the first through hole 23 in the blade 20. The first blocking part 24 can lock the pressing portion 41 in place and can prevent the pressing portion 41 from being released from the first through hole 23.

The elastic member 43 can be sleeved on the pressing portion 41 and abuts between the second blocking part 413 of the pressing portion 41 and the mounting base 30. In some embodiments, the elastic member 43 abuts between the second blocking part 413 of the pressing portion 41 and the third end portion 31 of the mounting base 30.

In some embodiments, a fastening portion 42 is a ball made from steel or other materials. In some instances, four fastening portions 42 may be provided. Alternatively, more than four or less than four fastening portions 42 are provided. In some embodiments, the snap slot 14 provided on the fastening arm 13 of the driving shaft 10 can be an arc recess having a radius identical to that of the fastening portion 42. The fastening portion 42 can be accommodable within the second accommodating hole 414 of the pressing portion 41. The fastening portion 42 can be received within the second accommodating hole 414 of the pressing portion 41.

Figure 5:
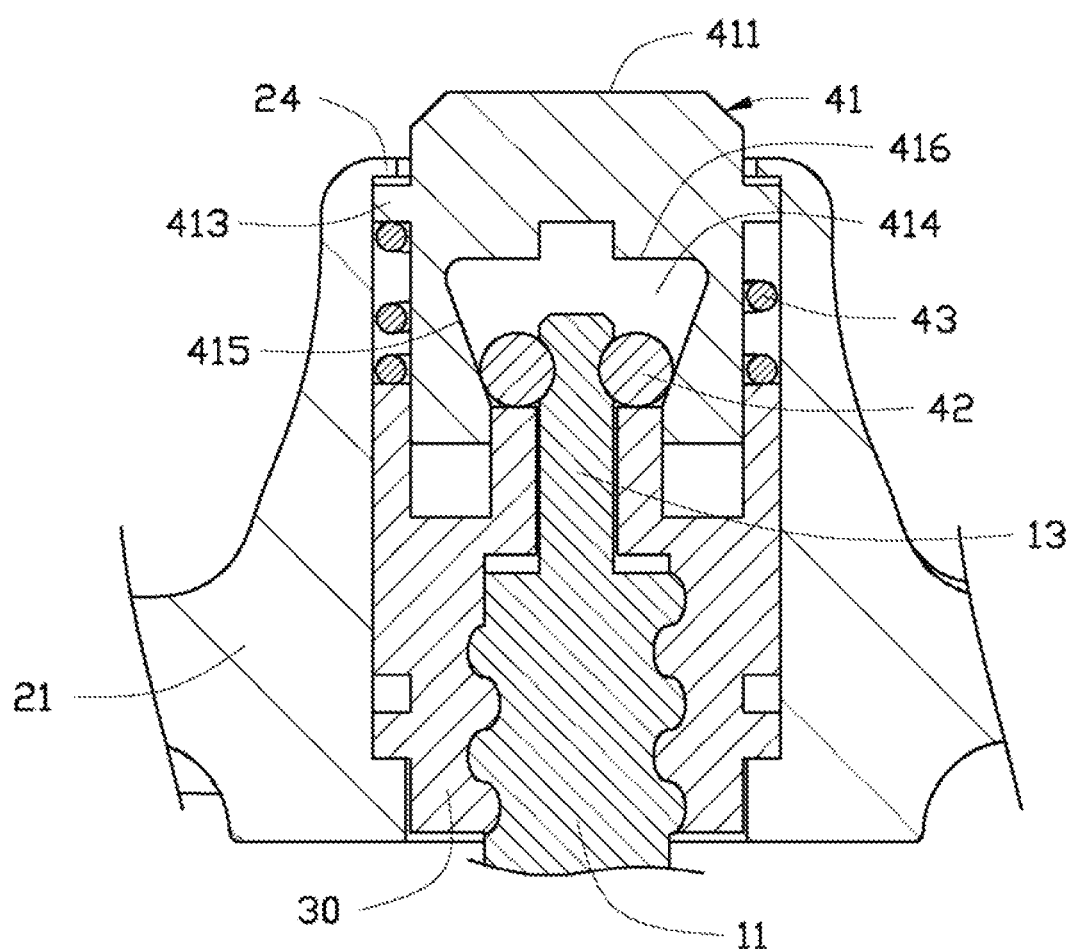
FIG. 5 is a cross sectional view of the propeller of FIG. 1 in a locked state, according to an embodiment of the present disclosure.

Referring to FIG. 3 and FIG. 5, the mounting base 30 is fixed in the first through hole 23, and thus firmly connected with the blade 20. The pressing portion 41 can be inserted into the first through hole 23 through a second opening 232 on the blade 20. The elastic member 43 can abut between the second blocking part 413 of the pressing portion 41 and a third end portion 31 of the mounting base 30. A pressing end 411 of the pressing portion 41 can protrude partially out of the second opening 232 on the blade 20 under the effect of the elastic member 43. The first blocking part 24 can prevent the pressing portion 41 from being released from the first through hole 23. A fastening portion 42 can be received within a second accommodating hole 414 of the pressing portion 41. A first end portion 11 of the driving shaft 10 can be connected with the mounting base 30. The fastening arm 13 can pass through the mounting hole 33 and the second through hole 35 while being inserted into the second accommodating hole 414 of the pressing portion 41.

In some embodiments, an inner diameter of a first accommodating hole 34 at a third end portion 31 of the mounting base 30 can be fitted with an outer diameter of the abutting end 412 of the pressing portion 41. The abutting end 412 of the pressing portion 41 can slide into the first accommodating hole 34 along the first through hole 23. A diameter of an opening of the second accommodating hole 414 of the pressing portion 41 can be fitted with a dimension of a protrusion 36 which is provided on the bottom surface 37 of the first accommodating hole 34 of the mounting base 30. A part of the protrusion 36 can protrude into the second accommodating hole 414. In some embodiments, the protrusion 36 can prevent the fastening portion 42 from getting out of the second accommodating hole 414.

As shown in FIG. 5, the locking part 40 is in a locked state. Under the effect of an elastic member 43, a second blocking part 413 of the pressing portion 41 can abut against the first blocking part 24. The fastening portion 42 can be received in the second accommodating hole 414 of the pressing portion 41, and pressed in the snap slot 14 of the fastening arm 13 of the driving shaft 10. The abutting part 415 can abut against the fastening portion 42 to confine the fastening portion 42, such that the fastening portion 42 is not releasable from the snap slot 14; therefore, a locking of a driving shaft 10 is effected.

Figure 6:
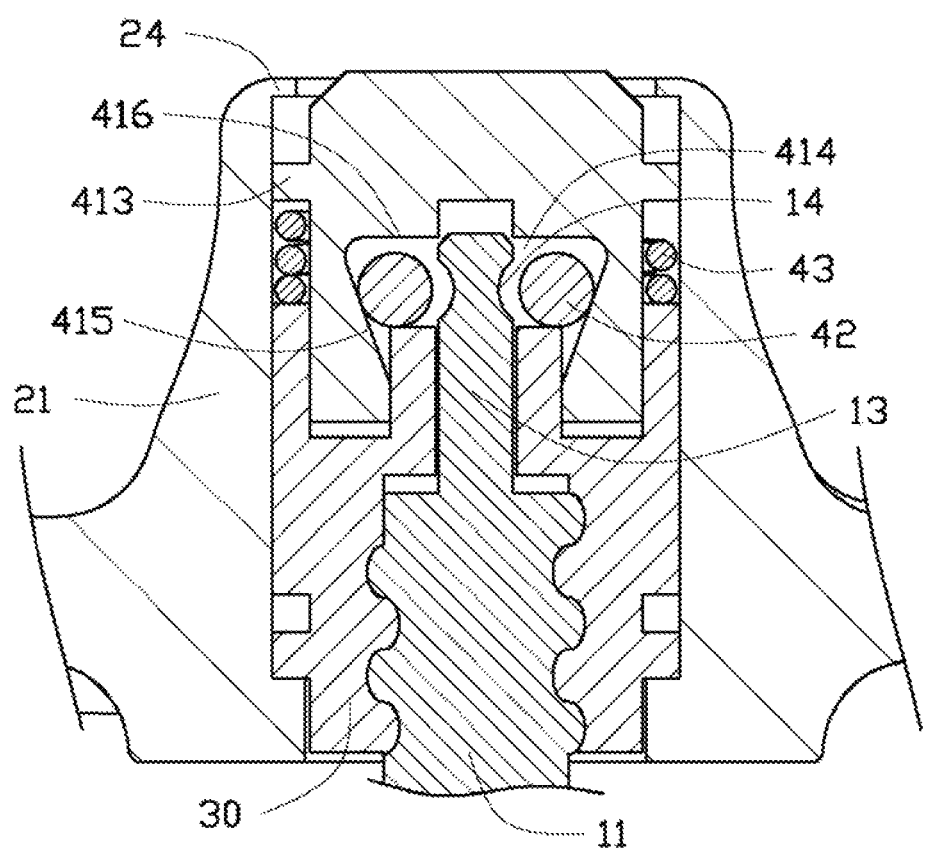
FIG. 6 is a cross sectional view of the propeller of FIG. 1 in an unlocked state, according to an embodiment of the present disclosure.

Referring to FIG. 3 and FIG. 6, the locking part 40 is in an unlocked state. Under the driving of an external force, the pressing portion 41 of the locking part 40 can slide along a first through hole 23 of the blade 20 towards the driving shaft 10. The abutting part 415 can be separated from the fastening portion 42, such that the fastening portion 42 is released from the snap slot 14. In the unlocked state, the mounting base 30 can be separated from the driving shaft 10 by retaining the external force applied on the pressing portion 41. In some embodiments, the driving shaft 10 is connected to the mounting base 30 by a threaded fitting, and the mounting base 30 can be detached from the driving shaft 10 by rotating the blade 20 along a screwing out direction.

In some embodiments, when the locking part 40 is in a locked state, the fastening portion 42 is received in the second accommodating hole 414 of the pressing portion 41 and pressed in the snap slot 14 of the fastening arm 13 of the driving shaft 10. A distance between a top of the fastening portion 42 distal from the driving shaft 10 and a bottom surface 416 of the second accommodating hole 414 can be less than or substantially equal to a diameter of the fastening portion 42. When the pressing portion 41 of the locking part 40 slides along a first through hole 23 of the blade 20 towards the driving shaft 10 under a driving of an external force, the fastening portion 42 can be position-limited near the fastening arm 13 of the driving shaft 10; therefore, the fastening portion 42 may not be positioned far away from the fastening arm 13 of the driving shaft 10.

To unlock, the external force applied onto the pressing portion 41 is removed. Under the effect of the elastic member 43, the pressing portion 41 can slide along a first through hole 23 of the blade 20 away from the driving shaft 10, and return to the locked state as shown in FIG. 5.

In some embodiments, the mounting base 30 and the blade base 21 can be integrally formed as a single device.

In some embodiments, the pressing portion 41 of the locking part 40 can be slidably disposed on the blade 20. As such, by sliding the abutting part 415, the abutting part 415 can switch between abutting against the fastening portion 42 and separating from the fastening portion 42. In addition, a sliding path of the pressing portion 41 can be controlled or confined by coordination between the second blocking part 413 on the pressing portion 41 and the first blocking part 24 on the blade 20.

In some embodiments, the driving shaft 10 can be locked with a mounting base 30, by providing the fastening arm 13 having the snap slot 14 on the driving shaft 10 and providing the locking part 40. The driving shaft 10 may not be accidentally loosened or released from the mounting base 30 even if the propeller 100 experiencing a vibration having large amplitude or a large change in acceleration. In addition, the propeller 100 of the present disclosure can be easily detached for replacement.

It should be understood that, the embodiments described hereinabove are merely illustrative of the present disclosure but not intended to limit the scope of the disclosure. It is intended that any variation or change made without departing from the disclosure is covered in the scope of the disclosure.

What is claimed is:

1. A propeller comprising:
   a blade; and
   a locking part, configured for locking the blade to a driving shaft and comprising:
   a fastening portion, and
   a pressing portion, comprising a pressing end, an abutting end including an accommodating hole formed by an inner side wall of the pressing portion, and an abutting part configured within the accommodating hole and disposed on the inner side wall of the pressing portion for abutting against the fastening portion, the fastening portion being accommodable within the accommodating hole of the pressing portion, wherein:
   the pressing portion of the locking part is slidably connected with the blade, and is configured to, when being pressed by an external force, slide along an axis direction of the driving shaft to separate the fastening portion from the abutting part to unlock the driving shaft,
   a portion of the driving shaft protrudes into the accommodating hole of the pressing portion, and
   the fastening portion is abutted against the abutting part of the pressing portion and engaged with the driving shaft to lock the driving shaft on the blade.

2. The propeller of claim 1, wherein:
   the fastening portion has a shape fitting with a snap slot configured on an end of a fastening arm on the driving shaft,
   the accommodating hole receives a portion of the fastening arm protruding into the accommodating hole, and
   the abutting part abuts against the fastening portion to snap fit the fastening portion into the snap slot, to lock the driving shaft to the blade.

3. The propeller of claim 1, wherein the abutting part is released from the fastening portion when the pressing portion slides to a preset position relative to the blade, such that the fastening portion is released from the driving shaft to unlock the driving shaft from the blade.

4. The propeller of claim 1, wherein the abutting part is in a wedge shape.

5. The propeller of claim 4, wherein a diameter of the accommodating hole increases in a direction from an opening in a surface of the abutting end into the pressing portion, and an inner side surface of the accommodating hole forms the wedge shape.

6. The propeller of claim 1, wherein the fastening portion includes one or more balls made from a metal material.

7. The propeller of claim 6, wherein the fastening portion includes 1 to 4 balls.

8. The propeller of claim 1, further comprising a mounting base connected with the blade, wherein:
   the mounting base comprises a mounting hole for connecting with the driving shaft and a through hole penetrating through the mounting base from a bottom surface of the mounting hole, and
   a fastening arm of the driving shaft passes through the through hole and protrudes into the accommodating hole.

9. The propeller of claim 8, wherein the driving shaft is threadedly connected with the mounting hole.

10. The propeller of claim 8, wherein a second through hole is provided on the blade, the mounting base is fixed in the second through hole, and the pressing portion is slidably configured in the second through hole.

11. The propeller of claim 10, wherein the locking part further comprises:
    an elastic member, abutting between the pressing portion and the mounting base,
    a first blocking part, provided on an inner side wall of the second through hole, and
    a second blocking part, corresponding to the first blocking part and provided on the pressing portion,
    wherein the first blocking part and the second blocking part match with each other to confine a movement of the pressing portion within the second through hole.

12. The propeller of claim 11, wherein when the fastening portion is fastened with the driving shaft, a distance between a top on the fastening portion distal from the driving shaft and a bottom surface of the accommodating hole is less than a diameter of the fastening portion, such that the fastening portion is position-limited at a periphery area around the fastening arm.

13. An aerial vehicle, comprising:
    an aerial vehicle body, comprising an electric motor and a propeller connected with a driving shaft of the electric motor, the propeller comprising:
    a blade; and
    a locking part configured for locking the blade to the driving shaft, the locking part comprising:
    a fastening portion, and
    a pressing portion, comprising a pressing end, an abutting end including an accommodating hole formed by an inner side wall of the pressing portion, and an abutting part configured within the accommodating hole and disposed on the inner side wall of the pressing portion for abutting against the fastening portion, the fastening portion being accommodable within the accommodating hole of the pressing portion,
    wherein:
    the pressing portion of the locking part is slidably connected with the blade, and is configured to, when being pressed by an external force, slide along an axis direction of the driving shaft to separate the fastening portion from the abutting part to unlock the driving shaft, a portion of the driving shaft protrudes into the accommodating hole of the pressing portion, and the fastening portion is abutted against the abutting part of the pressing portion and engaged with the driving shaft to lock the driving shaft on the blade.

14. The aerial vehicle of claim 13, wherein:

the fastening portion has a shape fitting with a snap slot configured on an end of a fastening arm on the driving shaft, the accommodating hole receives a portion of the fastening arm protruding into the accommodating hole, and the abutting part abuts against the fastening portion to snap fit the fastening portion into the snap slot, to lock the driving shaft to the blade.

15. The aerial vehicle of claim 13, wherein the abutting part is released from the fastening portion when the pressing portion slides to a preset position relative to the blade, such that the fastening portion is released from the driving shaft to unlock the driving shaft from the blade.

16. The aerial vehicle of claim 13, wherein the abutting part is in a wedge shape.

17. The aerial vehicle of claim 16, wherein a diameter of the accommodating hole increases in a direction from an opening in a surface of the abutting end into the pressing portion, and an inner side surface of the accommodating hole forms the wedge shape.

18. The aerial vehicle of claim 13, wherein the fastening portion includes one or more balls made from a metal material.

19. The aerial vehicle of claim 18, wherein the fastening portion includes 1 to 4 balls.

20. The aerial vehicle of claim 14, wherein the snap slot is a recess formed by recessing inwardly from an outer side surface of the end of the fastening arm.

* * * * *